United States Patent
Lewis et al.

(10) Patent No.: US 9,363,320 B2
(45) Date of Patent: Jun. 7, 2016

(54) PERSISTENT CONNECTION BETWEEN NETWORK DEVICES

(71) Applicant: Microsoft Corporation, Redmond, WA (US)

(72) Inventors: Richard Lewis, Lynnwood, WA (US); Clark Nicholson, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 337 days.

(21) Appl. No.: 13/706,344

(22) Filed: Dec. 5, 2012

(65) Prior Publication Data

US 2014/0156788 A1 Jun. 5, 2014

(51) Int. Cl.
  *G06F 15/16* (2006.01)
  *H04L 29/08* (2006.01)
  *H04L 12/00* (2006.01)
  *H04W 76/00* (2009.01)
  *H04L 29/06* (2006.01)
  *H04L 29/12* (2006.01)

(52) U.S. Cl.
  CPC .............. *H04L 67/145* (2013.01); *H04L 12/00* (2013.01); *H04L 61/2076* (2013.01); *H04L 63/08* (2013.01); *H04L 63/162* (2013.01); *H04W 76/00* (2013.01); *H04L 61/1511* (2013.01); *H04L 61/2007* (2013.01)

(58) Field of Classification Search
  CPC ..... H04L 67/145; H04L 12/00; H04L 63/162; H04L 61/2076; H04L 63/08; H04L 61/2007; H04L 61/1511; H04W 76/00
  USPC .......................................... 709/217, 227, 228
  See application file for complete search history.

(56) References Cited

U.S. PATENT DOCUMENTS

| | | | |
|---|---|---|---|
| 6,427,170 B1 | 7/2002 | Sitaraman et al. | |
| 7,554,995 B2 | 6/2009 | Short et al. | |
| 7,778,189 B2 | 8/2010 | Valli et al. | |
| 7,991,854 B2 | 8/2011 | Bahl | |
| 2004/0258007 A1* | 12/2004 | Nam et al. | 370/310 |
| 2009/0063686 A1 | 3/2009 | Schmidt et al. | |

(Continued)

OTHER PUBLICATIONS

Ford, Bryan et al., "Persistent Personal Names for Globally Connected Mobile Devices," 7th symposium on Operating systems design and implementation, Nov. 6, 2006, (16 pages).

(Continued)

*Primary Examiner* — Cheikh Ndiaye
(74) *Attorney, Agent, or Firm* — Henry Gabryjelski; Kate Drakos; Micky Minhas

(57) ABSTRACT

A first device and a second device are each assigned an IP address that is used to exchange messages with the other device. The first device stores the IP address for the second device. A new IP address may be assigned to the first device when it reestablishes a network connection following a location change or other network reconnection. The first device detects when a new IP address has been assigned. The first device then sends a hello message directly to the second device comprising the new IP address assigned to the first device. The new IP address allows the second device to find the first device without requiring network location services such as DNS. The first device may further include authentication credentials in the hello message to verify the new IP address.

18 Claims, 3 Drawing Sheets

(56) References Cited

U.S. PATENT DOCUMENTS

| | | | |
|---|---|---|---|
| 2009/0094317 A1* | 4/2009 | Venkitaraman | 709/203 |
| 2011/0153807 A1 | 6/2011 | Vicisano et al. | |
| 2011/0158238 A1* | 6/2011 | Chen et al. | 370/392 |
| 2011/0228725 A1* | 9/2011 | Nakamoto et al. | 370/328 |
| 2011/0320803 A1* | 12/2011 | Hampel et al. | 713/150 |
| 2012/0084364 A1* | 4/2012 | Sivavakeesar | 709/205 |
| 2013/0086644 A1* | 4/2013 | Bahn et al. | 726/4 |

OTHER PUBLICATIONS

Nazir, Fawad et al., "Towards Mobility Enabled Protocol Stack for Future Wireless Networks," Ubiquitous Computing and Communication Journal, vol. 2 No. 4, Aug. 15, 2007, pp. 65-79.

Funato, Daichi et al., "TCP-R: TCP Mobility Support for Continuous Operation," IEEE International Conference on Network Protocols, Oct. 28, 1997, pp. 229-236.

* cited by examiner

PERSISTENT CONNECTION BETWEEN NETWORK DEVICES

BACKGROUND

Two computers or other devices may establish a persistent relationship using an IP network connection. For example, one device may function as a client and the other as a server. The devices may need to maintain their connection so that they can exchange information or so that one can control the other. When one device goes offline, for example, during a restart or to conserve power, the devices must reestablish their connection after they are both back online. Often there is a need to reestablish this connection quickly so that the devices can resume prior operations or respond to current activities.

To reestablish their connection, the devices typically use network location services, such as the Domain Name System (DNS), which resolves queries for domain names into IP addresses to locate computer services and devices. However, network location services are designed for devices that do not move frequently and, therefore, do not frequently change the IP address contained in a network location service record. When a device receives a new IP address, such as due to a move or for other reasons, there can be a latency of thirty minutes or more after the device receives the new IP address before network location service records are updated across the network. Until the network location service records are updated, other network devices will not be able to find the new IP address and will not be able to establish a connection with the device.

Other attempts to solve the problem caused by the delayed updating of the network location service records include, for example, the use of address management nodes that hold updated IP addresses for device, and the use broadcast messages to distribute updated IP addresses when a device comes online or otherwise is assigned a new IP address. The use of address management nodes creates the same problem as a central network location service, such as DNS, wherein the address management nodes must be timely updated for them to be useful. The use of broadcast messages has the undesired effect of broadcasting a message to all devices on the subnet. This is likely to cause network congestion due to excessive broadcast traffic if there are many devices on the subnet, if the network is large, or if devices frequently arrive on the subnet and/or frequently go offline.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments provide a mechanism for establishing a persistent connection between two network devices. When the devices are subject to conditions that cause frequent changes in the records for network location services or DNS, the devices are able to reestablish the persistent connection quickly without using broadcast messages and without waiting for the location services or DNS to update. This scenario may be common, for example, when mobile network devices, such as smartphones, tablets, and other mobile devices, reestablish or reregister a network connection and receive a new IP address.

A persistent network connection is established between a first device and a second device. Each device is assigned an IP addresses that is used to exchange messages with the other device. The first device stores the IP address for the second device. The IP address for the second device allows the first device to send messages directly to the second device without requiring network location services, such as DNS.

The first device may be mobile or portable so that it occasionally or frequently changes locations. In other embodiments, the first device may periodically be disconnected from the network. A new IP address may be assigned to the first device when it reestablishes a network connection following these location changes and/or shutdowns. The first device detects when a new IP address has been assigned. The first device then sends a hello message directly to the second device. The hello message comprising the new IP address assigned to the first device. The new IP address will allow the second device to find the first device following the location change, shutdown, or other network connection reestablishment and to send messages directly to the first device without requiring network location services or DNS. After receiving the message with the new IP address, the second device may send messages directly to the first device at the new IP address.

In addition to establishing a persistent connection, the first and second devices may further establish authentication credentials. The authentication credentials may be provided from the first device to the second device as part of the hello message to verify the new IP address.

In other embodiments, the hello message may be sent directly from the first device to the second device in a manner that allows the new IP address to be written directly to a storage location on the second device. For example, the new IP address for the first device may be written to a particular port, memory location, or register on the second device. When the second device detects the presence of a new IP address—such as when a new IP address flag is set or when a write is detected to the new IP address location—the second device will then begin sending messages to the first device at the new IP address.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
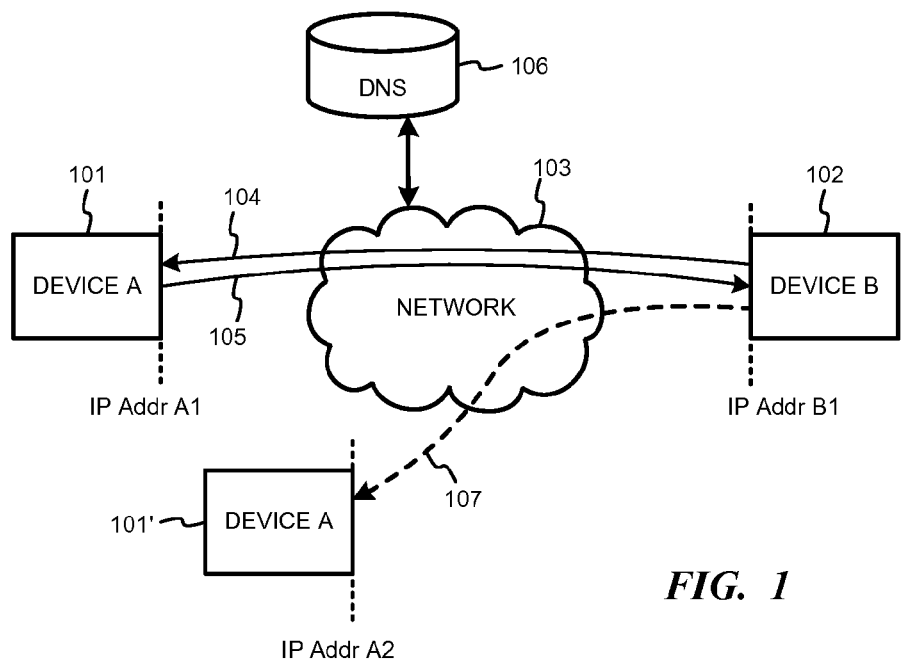
FIG. 1 illustrates two network devices communicating across a network using a persistent connection.

FIG. 1 illustrates two network devices 101, 102 communicating across network 103. Device A 101 is assigned IP Address A1 on network 103, and device B 102 is assigned IP Address B1 on network 103. The devices 101, 102 exchange messages 104 and 105 across network 103 using these assigned IP addresses. DNS 106 is used to track the current IP address assigned to devices on network 103. DNS 106 maintains the domain name hierarchy and provides translation services for address spaces. When device A 101 wants to establish a connection to device B 102, device A 101 uses DNS 106 to translate the host domain name for device B 102 into a currently assigned IP address that can be used to establish a connection 104. Problems arise in the scenario of FIG. 1 when device A 101 and/or device B 102 move or assigned a new IP address.

For example, device A 101 may move to a new location 101' and be assigned a new address IP Address A2. Eventually, the records in DNS 106 will be update with the new IP address A2 for device A 101'. Until those records are updated, however, the new IP Address A2 cannot be found by device B using DNS 106. Accordingly, device B 102 cannot set up a new connection 107 to device A 101' until DNS 106 has been updated. During that period, the devices 101', 102 may be unable to communicate.

Figure 2:
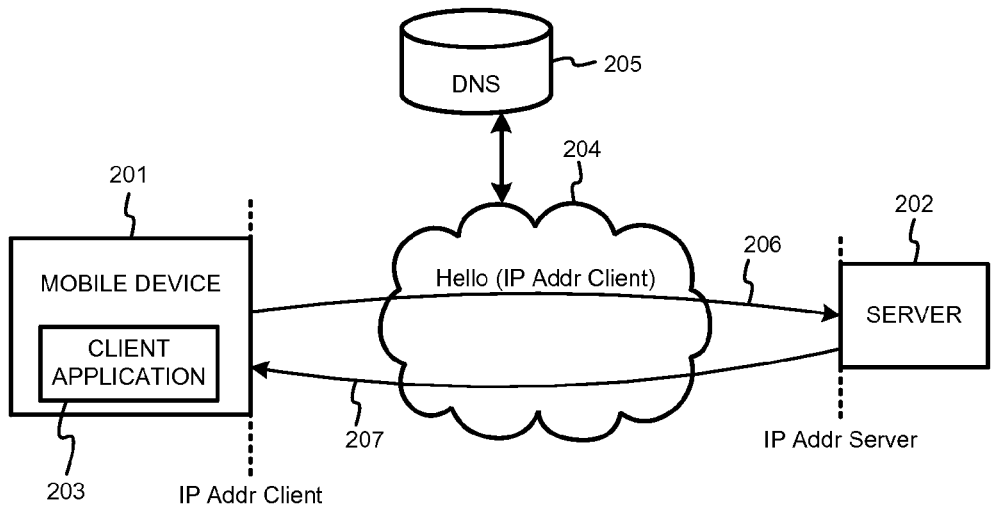
FIG. 2 illustrates two network devices that share a persistent network connection supporting, for example, a client application on a mobile device according to one embodiment.

FIG. 2 illustrates two network devices 201, 202 that share a persistent network connection supporting, for example, a client application 203 on mobile device 201. Server 202 is at a fixed location and has been assigned a relatively stable IP address on network 204. Mobile device 201 knows the DNS host name and IP address (IP Address Server) for server 202 and, therefore, can always send messages to server 202. Mobile device 201 may move around to different locations on network 204 and/or may be frequently disconnected and reconnected to network 204. Accordingly, the IP address (IP Address Client) for mobile device 201 may change over time. This may prevent server 202 from reestablishing a connection to mobile device 201. Eventually, DNS 205 on network 204 will be updated with the IP address for mobile device 201; however, the IP address for mobile device 201 cannot be located until the DNS 205 is updated.

In one embodiment, mobile device 201 detects when a new network connection has been made or when it receives a new IP address. Mobile device 201 will then attempt to locate server 202 on network 204 via DNS 205 or some other network location service using the host name for server 202. When server 202 is located, mobile device 201 sends a hello message 206 directly to server 202. The hello message 206 indicates that mobile device 201 is now available on network 204. The hello message 206 also includes the new IP address (IP Address Client) for mobile device 201. This will allow server 202 to locate mobile device 201, even if the records in DNS 205 or the metadata in other network location services is incorrect for mobile device 201. Server 202 can then contact mobile device 201 via message 207.

If authentication is required to reestablish the persistent connection, mobile device 201 may provide authentication credentials in hello message 206 or in response to message 207. Such authentication credentials may be established using any appropriate authentication mechanism. For example, when the relationship between mobile device 201 and server 202 is established, the devices 201, 202 establish a shared secret. The secret may be used to authenticate device 201 when it provides its host name and IP address to server 202. At the time when mobile device 201 provides its host name and IP address to server 202, mobile device 201 must also provide digital evidence that it knows the shared secret, without actually revealing the secret to server 202. A number of well understood mechanisms exist for establishing this evidence, such as using a salted hash or authenticating credentials for a secure local user account on server 202.

The connection between the devices may be symmetric so that either device may send a hello message 206 to the other device upon detection of a new IP address or a new network connection. All that is necessary in this scenario is that the device with a new IP address knows the host name for the other device. For example, a persistent connection may be established between two mobile devices. Each device is aware of the other device's current assigned IP address. When one device detects that it has received a new IP address (e.g., in response to movement or following a broken and reestablished connection to the network), that device sends a hello message directly to the other device at its last known IP address. The device with the new IP address does not need to request updated address information from the DNS system because it already knows the IP address for the other device. If the other device has not also received a new IP address, then it should receive and respond to the hello message as appropriate, such as by requesting authentication credentials or reestablishing the persistent connection. In the event that both devices had received new IP addresses, then they may default to reestablishing a connection using DNS.

In other embodiments, DNS 106 (FIG. 1) or DNS 205 (FIG. 2) may be any network location service.

Although described in terms of a client-server relationship in FIG. 2, it will be understood that the techniques for maintaining a persistent connection described herein may be used by any devices. Such devices may include, for example, a desktop, notebook, laptop, or tablet computer, a smartphone, a personal digital assistant (PDA), a telematics device, or the like. Additionally, the devices may be connected to the same local network or subnet or to different or remote networks so long as one device knows the IP address of the other device and can send the appropriate hello message directly to that device at the known IP address. The networks may provide wired and/or wireless connections between the devices.

Additionally, it will be understood that devices implementing the techniques described herein may use them to maintain persistent network connections to a plurality of other devices. For example, server 202 may support or operate with a plurality of mobile devices 201, each assigned a unique IP address that may change when the mobile devices move or otherwise reestablish a network connection.

Figure 3:
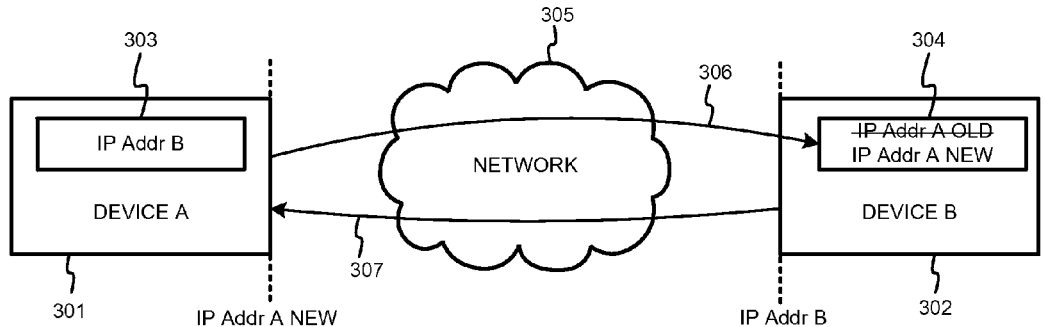
FIG. 3 illustrates two devices maintaining a persistent connection using an alternate hello message according to another embodiment.

FIG. 3 illustrates two devices 301, 302 maintaining a persistent connection using an alternate hello message 303 according to another embodiment. Device A 301 and device B 302 maintain a persistent connection between them. Device A 301 has a register 303 or other storage location for storing the IP address for device B 302. Similarly, device B 302 has a register 304 for storing the IP address for device A 301. The devices exchange messages directed to the IP addresses stored in registers 303 and 304.

If, for example, device A 301 receives a new address (IP Addr A NEW) on network 305, it knows that device B 302 does not have the new address and will no longer be able to maintain the persistent connection using the prior address (IP Addr A OLD). Device A 301 sends a message 306 directly to device B 302 and overwrites the old IP address with the new IP address in register 304. Device A uses the IP address stored in register 303 to send message 306 directly to device B 302. Register 303 may include additional routing (e.g., a port number, etc.) and/or authentication information (e.g., authentication credentials, etc.) as required to write the updated address data to register 304. Upon detecting the presence of new or updated address data in register 304, device B 302 may send messages 307 directly to device A 301 without requiring DNS or another network location service.

Additionally, it will be understood that devices implementing the techniques described in connection with FIG. 3 may use them to maintain persistent network connections to a plurality of other devices. For example, device B 302 may support or operate with a plurality of other devices, such as device a 301. Device B 302 may have a plurality of memory locations, registers, or data stores 304 so that each data store 304 can store the unique IP address for another device. Each of the other devices may update its IP address in a respective data store 304 when the device moves or otherwise reestablishes a network connection.

Figure 4:
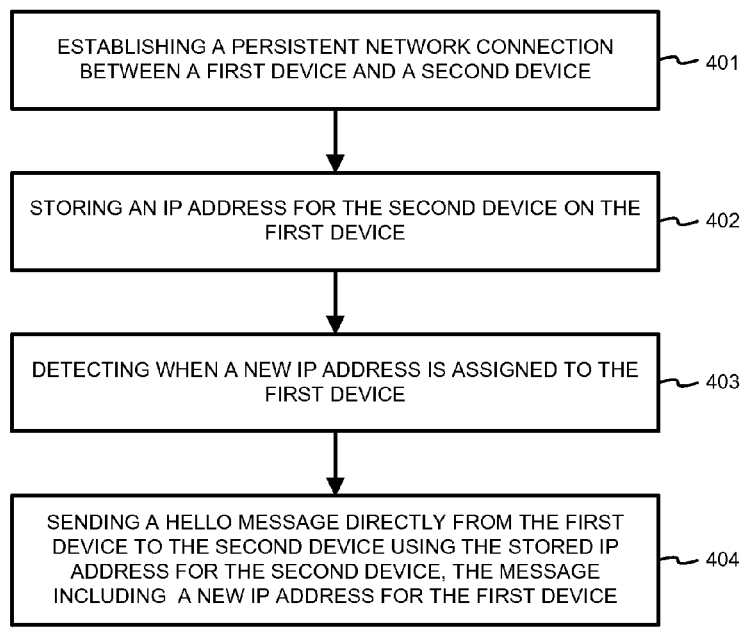
FIG. 4 is a flow chart illustrating a method or process for maintaining a persistent connection between two devices on a network according to one embodiment.

FIG. 4 is a flow chart illustrating a method or process for maintaining a persistent connection between two devices on a network according to one embodiment. In step 401, a persistent network connection is established between a first device and a second device. The first device and the second device use IP addresses assigned by their respective networks to exchange messages. The networks may be wired or wireless networks, such as the Internet, an intranet, a subnet, an enterprise network, a WiFi network, or the like. The devices store the host name or IP address for the other device in a memory, register, or other data store. In step 402, the first device stores an IP address for the second device. The IP address for the second device allows the first device to send messages directly to the second device without requiring network location services, such as DNS.

The first device and/or the second device may be mobile or portable so that they occasionally or frequently change locations. In other embodiments, the first device and/or the second device may periodically be disconnected from the network, such as during a shutdown for a power-saving mode or at the end of a work cycle, shift, or school day. The device(s) reestablish a network connection following these location changes and/or shutdowns. When the network connection is reestablished, a new IP address may be assigned to the device.

In step 403, the first device detects when a new IP address has been assigned, such as following a location change, shutdown, or other reconnection to the network.

In step 404, the first device sends a hello message directly to the second device. The hello message comprising the new IP address assigned to the first device. The new IP address will allow the second device to find the first device following the location change, shutdown, or other network connection reestablishment and to send messages directly to the first device without requiring network location services or DNS. This allows the first and second devices to remain in contact on the persistent connection without waiting for network location services to update. After receiving the message with the new IP address, the second device may send messages directly to the first device at the new IP address.

As discussed above, in addition to establishing a persistent connection in step 401, the first and second devices may further establish authentication credentials. The authentication credentials may be provided from the first device to the second device as part of the hello message in step 404 to verify the new IP address.

In other embodiments, the hello message may be sent directly from the first device to the second device in a manner that allows the new IP address to be written directly to a storage location on the second device. For example, the new IP address for the first device may be written to a particular port, memory location, or register on the second device. When the second device detects the presence of a new IP address—such as when a new IP address flag is set or when a write is detected to the new IP address location—the second device will then begin sending messages to the first device at the new IP address.

Although the example embodiments described in connection with FIGS. 1-4 use Internet Protocol (IP) terminology, it will be understood by those of ordinary skill in the art that the invention is not dependent on IP but will apply to any protocol with similar dynamic address assignment and location services.

Figure 5:
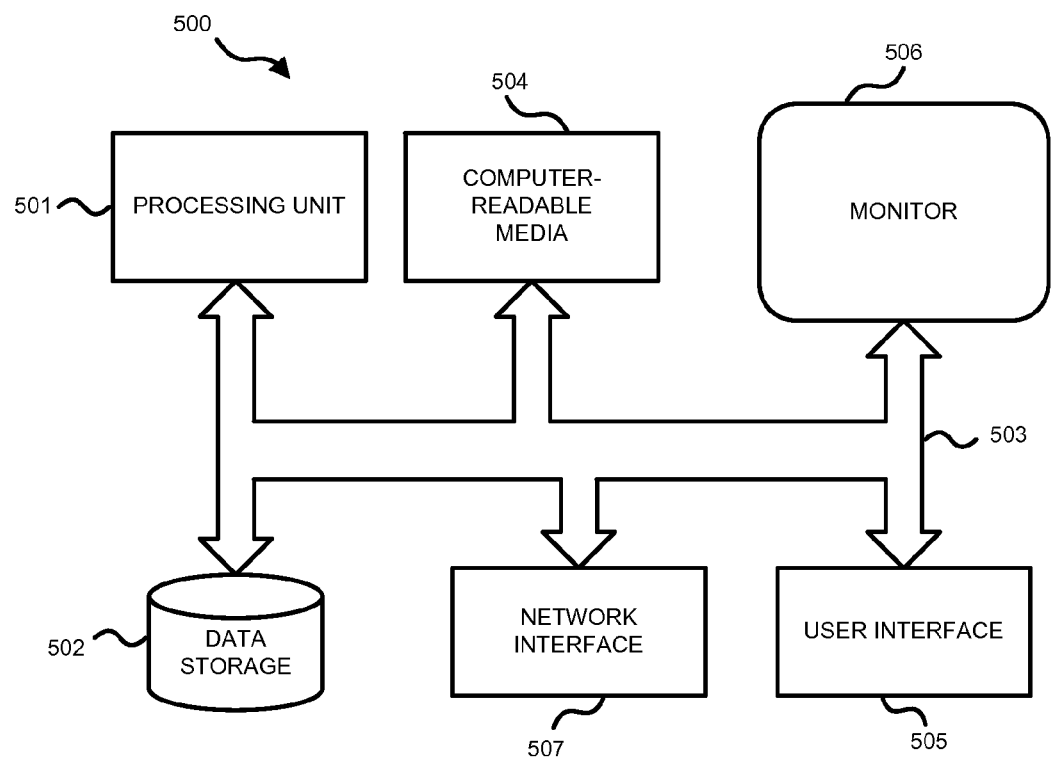
FIG. 5 illustrates an example of a suitable computing and networking environment implemented to support a persistent network connection when a device may frequently receive a new or updated IP address.

FIG. 5 illustrates an example of a suitable computing and networking environment 500 on which the examples of FIGS. 2-4 may be implemented to support a persistent network connection when a device may frequently receive a new or updated IP address. The computing system environment 500 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 500. Components may include, but are not limited to, various hardware components, such as processing unit 501, data storage 502, such as a system memory, and system bus 503 that couples various system components including the data storage 502 to the processing unit 501. The system bus 503 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 typically includes a variety of computer-readable media 504. Computer-readable media 504 may be any available media that can be accessed by the computer 500 and includes both volatile and nonvolatile media, and removable and non-removable media, but excludes propagated signals. By way of example, and not limitation, computer-readable media 504 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 502 includes computer storage media in the form of volatile and/or nonvolatile memory such as read only memory (ROM) and random access memory (RAM). A basic input/output system (BIOS), containing the basic routines that help to transfer information between elements within computer 500, such as during start-up, is typically stored in ROM. RAM typically contains data and/or program modules that are immediately accessible to and/or presently being operated on by processing unit 501. By way of example, and not limitation, data storage 502 holds an operating system, application programs, and other program modules and program data.

Data storage 502 may also include other removable/non-removable, volatile/nonvolatile computer storage media. By way of example only, data storage 502 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computer 500, such as host names and IP addresses for other devices.

A user may enter commands and information through a user interface 505 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 501 through a user input interface 505 that is coupled to the system bus 503, but may be connected by other interface and bus structures, such as a parallel port, game port or a universal serial bus (USB). A monitor 506 or other type of display device is also connected to the system bus 503 via an interface, such as a video interface. The monitor 506 may also be integrated with a touch-screen panel or the like. Note that the monitor and/or touch screen panel can be physically coupled to a housing in which the computing device 500 is incorporated, such as in a tablet-type personal computer. In addition, computers such as the computing device 500 may also include other peripheral output devices such as speakers and printer, which may be connected through an output peripheral interface or the like.

The computer 500 may operate in a networked or cloud-computing environment using logical connections 507 to one or more remote devices, such as a remote computer. The remote computer may be a personal computer, a server, a router, a network PC, a peer device or other common network node, and typically includes many or all of the elements described above relative to the computer 500. The logical connections depicted in FIG. 5 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 500 may be connected to a public or private network through a network interface or adapter 507. In some embodiments, a modem or other means for establishing communications over the network. The modem, which may be internal or external, may be connected to the system bus 503 via the network interface 507 or other appropriate mechanism. A wireless networking component such as comprising an interface and antenna may be coupled through a suitable device such as an access point or peer computer to a network. In a networked environment, program modules depicted relative to the computer 500, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. In a first device having a processor and a memory coupled to the processor, the memory having program instructions stored thereon that, upon execution by the processor, configure the first device to enable persistent connections with a second device, a method comprising:
    establishing a network connection between the first device and the second device;

storing an IP address for the second device on the first device, the IP address for the second device allowing the first device to send messages directly to the second device without using network location services, wherein the network location services comprises a Domain Name System (DNS);

detecting when a new IP address is assigned to the first device;

generating an authentication credential including a salted hash; and sending a single message directly from the first device to the second device using the stored IP address, the single message comprising the authentication credential and the new IP address, wherein the new IP address is written directly to a storage location on the second device, the second device configured to verify an identity of the first device using the authentication credential and without revealing the salted hash, and wherein, upon detecting the new IP address written directly to the storage location on the second device and in response to the verification based upon the new IP address, the second device is further configured to send additional messages to the first device at the new IP address without using network location services.

2. The method of claim 1, further comprising:
establishing a persistent network connection between the first device and the second device; and
storing an IP address for the second device on the first device, the IP address for the second device allowing the first device to send messages directly to the second device without requiring the network location services.

3. The method of claim 1, wherein the network location services comprises a Domain Name System (DNS).

4. The method of claim 1, wherein
the storage location on the second device comprises a particular port, memory location, or register on the second device.

5. The method of claim 1, further comprising:
storing a host name for the second device on the first device; and
sending the message directly from the first device to the second device using the stored host name.

6. The method of claim 1, further comprising:
receiving the message with the new IP address at the second device; and
sending messages directly to the first device at the new IP address.

7. The method of claim 1, further comprising:
detecting the new IP address written to the storage location on the second device; and
sending messages directly to the first device at the new IP address.

8. A computer system, comprising:
one or more processors; and
memory coupled to the one or more processors, the memory having stored thereon computer-executable instructions that, upon execution by the one more processors, causes the computer system to:
establish a network connection between the first device and the second device;
store an IP address for the second device on the first device, the IP address for the second device allowing the first device to send messages directly to the second device without using network location services, wherein the network location services comprises a Domain Name System (DNS);
detect when a new IP address is assigned to the computer system;
generate an authentication credential including a salted hash; and
send a single message directly to the remote device using the stored IP address, the single message comprising the authentication credential and the new IP address, wherein the new IP address is written directly to a storage location on the remote device, the remote device configured to verify an identity of the first device using the authentication credential and without revealing the salted hash, and wherein, upon detecting the new IP address written directly to the storage location on the second device and in response to the verification based upon the new IP address, the second device is further configured to send additional messages to the first device at the new IP address without using network location services.

9. The computer system of claim 8, wherein the computer-executable instructions, upon execution by the one or more processor, further cause the compute system to:
establish a persistent network connection between the computer system and the remote device; and
store an IP address for the remote device, the IP address for the remote device allowing the computer system to send messages directly to the remote device without requiring the network location services.

10. The computer system of claim 8, wherein the computer-executable instructions, upon execution by the one or more processor, further cause the computer system to:
store a host name for the remote device; and
send the message directly to the remote device using the stored host name.

11. The computer system of claim 8, wherein the computer-executable instructions, upon execution by the one or more processor, further cause the computer system to:
receive messages directly from the remote device at the new IP address.

12. The computer system of claim 8, wherein
the storage location on the remote device is a particular port, memory location, or register on the second device.

13. The computer system of claim 8, wherein the computer-executable instructions, upon execution by the one or more processor, further cause the computer system to:
detect a second new IP address written to a storage location corresponding to remote device; and
send messages directly to the remote device at the second new IP address.

14. A memory device having computer-executable instructions that, upon execution by at least one processor of a computer system, cause the computer system to:
establish a persistent network connection between a first device and a second device;
store an IP address for the second device on the first device, the IP address for the second device allowing the first device to send messages directly to the second device without requiring network location services, wherein the network location services comprises a Domain Name System (DNS);
detect when a new IP address is assigned to the first device;
generate an authentication credential including a salted hash; and
send a single message directly to the remote device using the stored IP address, the single message comprising the authentication credential and the new IP address, wherein the new IP address is written directly to a storage location on the second device, the second device configured to verify the identity of the first device using the authentication credential and without revealing the salted hash, and wherein, upon detecting the new IP address written directly to the storage location on the second device and in response to the verification based upon the new IP address, the second device is further configured to send additional messages to the first device at the new IP address without using network location services.

15. The memory device of claim 14, the method further comprising:
   establish authentication credentials between the first device and the second device; and
   provide the authentication credentials from the first device to the second device to verify the new IP address.

16. The memory device of claim 14, wherein the network location services comprises a Domain Name System (DNS).

17. The memory device of claim 14, wherein the storage location on the second device is a particular port, memory location, or register on the second device.

18. The memory device of claim 14, the method further comprising:
   detect the new IP address written to the storage location on the second device; and
   send messages directly to the first device at the new IP address.

* * * * *